(12) United States Patent
Nakagawa et al.

(10) Patent No.: US 8,240,852 B2
(45) Date of Patent: Aug. 14, 2012

(54) IMAGE PROCESSING METHOD AND IMAGE PROCESSING DEVICE

(75) Inventors: Toshiaki Nakagawa, Hamamatsu (JP); Shigeru Takimoto, Hamamatsu (JP)

(73) Assignee: Kowa Company Ltd. (JP)

( * ) Notice: Subject to any disclaimer, the term of this patent is extended or adjusted under 35 U.S.C. 154(b) by 14 days.

(21) Appl. No.: 12/930,739

(22) Filed: Jan. 14, 2011

(65) Prior Publication Data

US 2011/0176108 A1 Jul. 21, 2011

(30) Foreign Application Priority Data

Jan. 20, 2010 (JP) ................................ 2010-010292

(51) Int. Cl.
*A61B 3/14* (2006.01)
*A61B 3/00* (2006.01)
(52) U.S. Cl. ........................................ 351/206; 351/246
(58) Field of Classification Search .......... 351/200–245; 369/14, 94, 273; 348/222.1; 382/254, 293–298; 375/240.1, 240
See application file for complete search history.

(56) References Cited

U.S. PATENT DOCUMENTS 7,524,061 B2 * 4/2009 Yan et al. ...................... 351/206
7,854,510 B2 * 12/2010 Verdooner et al. ............ 351/214

* cited by examiner

*Primary Examiner* — Mohammed Hasan
(74) *Attorney, Agent, or Firm* — Adams & Wilks

(57) ABSTRACT

An ocular fundus image is captured by a fundus camera. Blood vessel regions are erased from the ocular fundus image, and a luminance region greater than a prescribed luminance threshold value and having an area equivalent to a predetermined standard disc area is extracted as a region having a standard disc area. The region having the standard disc area is divided into a plurality of regions by a plurality of dividing lines extending radially from the center of gravity thereof, and divided regions are scanned radially from the center of gravity while angles are shifted to detect in each individual region a point at which luminance variation reaches a maximum. The contour line of the disc region is derived from these points.

14 Claims, 12 Drawing Sheets

# IMAGE PROCESSING METHOD AND IMAGE PROCESSING DEVICE

BACKGROUND OF THE INVENTION

1. Field of the Invention

The present invention relates to an image processing method and an image processing device for processing images of the optic disc region of a photographed ocular fundus under examination.

2. Description of the Related Art

In the field of methods for diagnosing the ophthalmic disorder of glaucoma, image processing is known which evaluates the shape and size of the optic disc (hereinafter referred to simply as the disc or disc region) in an image of the ocular fundus.

When the magnitude of optic disc cupping is to be evaluated via image analysis, they define the diameter ratio C/D of the diameter of the optic disc cupping, called the "cup", and the diameter of the optic disc, called the "disc" (see Japanese Patent No. 3594468).

The medial region lying between the disc region and the cup region is termed the "rim" and observation of the width of this rim is one method for the examiner to diagnose glaucoma.

According to Japanese Patent No. 3594468, an image of the ocular fundus containing the disc region is displayed, and the disc region is specified manually in the displayed image using a mouse, keyboard, input stylus or the like. The cup region is then computed automatically from the height thereof.

Japanese Laid-Open Patent Application 2008-73188 also proposes a method of automatically computing the cup line (cup contour) from the degree of bending of the vessels in the ocular fundus image.

Japanese Laid-Open Patent Application 2006-280411 discloses a method in which the disc line (disc contour) and cup line (cup contour) are computed using a spline approach to derive therefrom the C/D ratio, which is compared with the C/D ratio from the measurements with a table of C/D ratios for normal eyes created in advance in order to diagnose ophthalmic disorders.

Document, "Application in Auto-recognition and Pseudo-stereoscopic Image Generation of the Optic Disc Using Images with Blood Vessels Erased for a System of Assisted Diagnosis of Ocular Fundus Images", IEICE Transactions, D, Vol. J89-D, No. 11, pp. 2491-2501, 2006, also proposes a method of erasing blood vessel regions from a captured ocular fundus image, automatically recognizing the optic disc using the image from which the blood vessel regions are erased, and generating a pseudo-stereoscopic image.

SUMMARY OF THE INVENTION

When the C/D ratio is employed for diagnosing the disorder of glaucoma, it is necessary to determine the cup contour and the disc contour. However, in the prior art, contour points of these were determined manually using an input device such as a mouse, and thus the determination involved some subjectivity, resulting in individual variability. Individual variability is particularly great in the cup region, which significantly affects diagnosis of glaucoma and poses a risk of misdiagnosis.

It is therefore an object of the present invention to provide an image processing method and an image processing device for automatically determining cup contour and disc contour and for minimizing individual variability (subjectivity) in computation of the C/D ratio so that assisted diagnosis of glaucoma may be carried out more accurately and efficiently.

The present invention provides an image processing method for processing an image of an optic disc region in a photographed ocular fundus, comprising extracting a disc region; dividing the disc region into a plurality of regions by a plurality of dividing lines that extend radially from the center of gravity of the disc region; radially scanning the divided regions from the center of gravity while angles are shifted in order to detect in each individual region a point at which luminance variation reaches a maximum; and determining a contour line of the disc region based on the detected points at which luminance variation reaches a maximum.

The present invention further provides an image processing method for processing an image of an optic disc region in a photographed ocular fundus, comprising dividing a disc region into a plurality of regions by a plurality of dividing lines that extend radially from a point that is set in the disc region; radially scanning the divided regions from the set point while angles are shifted in order to detect in each individual region a point at which depth variation reaches a maximum; and determining a contour line of the cup region based on the detected points at which depth variation reaches a maximum.

According to the present invention, a disc region is divided into a plurality of regions by a plurality of dividing lines that extend radially from a prescribed point.

The divided regions are then scanned radially from the established point while angles are shifted in order to detect in each region a point at which luminance variation or depth variation reaches a maximum, and the contour line of the disc region or cup region is determined from these points. This allows the disc contours or cup contours to be determined automatically, and assisted diagnosis of glaucoma to be carried out more accurately and efficiently.

DESCRIPTION OF THE PREFERRED EMBODIMENTS

The present invention will now be described in detail with reference to the embodiment, which shows an ophthalmic measurement apparatus in which the ocular fundus under examination is stereographically photographed using a stereographical imaging optical system, and the photographed image undergoes three-dimensional measurement processing.

<System Configuration>

Figure 1:
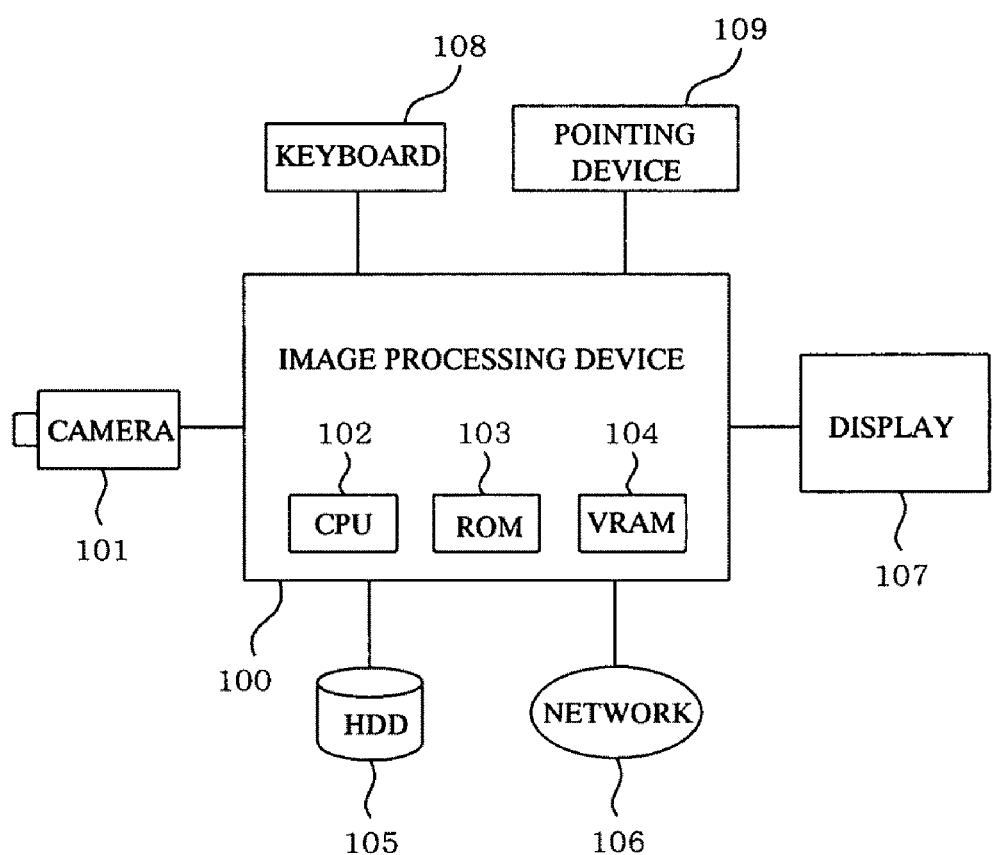
FIG. 1 is a block diagram showing a configuration of an image processing system that the present invention employs.

FIG. 1 shows a configuration of an ophthalmic measurement apparatus showing one embodiment of the present invention. In FIG. 1, symbol 101 denotes a fundus camera. In order to photograph the ocular fundus under examination (not shown) under prescribed photographic conditions, the fundus camera is equipped with mechanisms such as, for example, an alignment mechanism, a monocular photography mechanism, and a stereographic photography mechanism. The fundus camera 101 has an image pickup device for color photography, such as a three-plate CCD or CMOS sensor for example, and outputs ocular fundus color image data of the eye under examination as digital data to an image processing device 100. When the picture signal output by the fundus camera 101 has a format such as YUV (YPbPr or YCbCr), a color separation process is carried out to convert the image data to that of a different spectrum such as RGB image data.

Such a color separation process would be necessary when the fundus camera 101 outputs images in a format such as JPEG (or MPEG), for example.

The image processing device 100 is constituted by hardware such as a PC, for example. The image processing device 100 carries out control of the system as a whole, and also includes a CPU 102 that constitutes the principal image processing means for carrying out image processing, which will be discussed later. Of course, the image processing device 100 could instead be constituted by dedicated hardware integrated in the fundus camera 101.

Image processing is executed using a VRAM (image memory) 104 serving as the work area. An additional memory for use in system control apart from image processing is a memory constituted by dynamic RAM or the like. A program for execution by the CPU 102 to carry out the image processing is stored in a ROM 103 or a hard disk (HDD) 105.

The hard disk 105 is used for storage of captured image data of an eye under examination, numeric data such as measurement results, output image data generated by the image processing, and the like.

As display output means, a display 107 composed of an LCD or EL panel, a CRT, or the like is connected to the image processing device 100, and a user interface screen or output screen is displayed on the display 107 for the purpose of controlling image processing by the image processing device 100. For the purpose of carrying out these screen displays and overall control of the instrument, the image processing device 100 is provided with user interface means composed of a keyboard 108 and a mouse or other pointing device 109.

The image processing device 100 performs image processing, generates image data enabling the examiner to easily determine the ocular fundus under examination, particularly the cup region and disc region, and outputs the data to the display 107.

A network 106 is connected to the image processing device 100 via a network interface (not shown). The image processing device 100 outputs the aforementioned captured image data of the eye under examination, numeric data such as measurement results, output image data generated by the image processing, and the like to an external computer, or to a separate image processing device or ophthalmic measurement apparatus, or the like.

<Image Processing>

Figure 3:
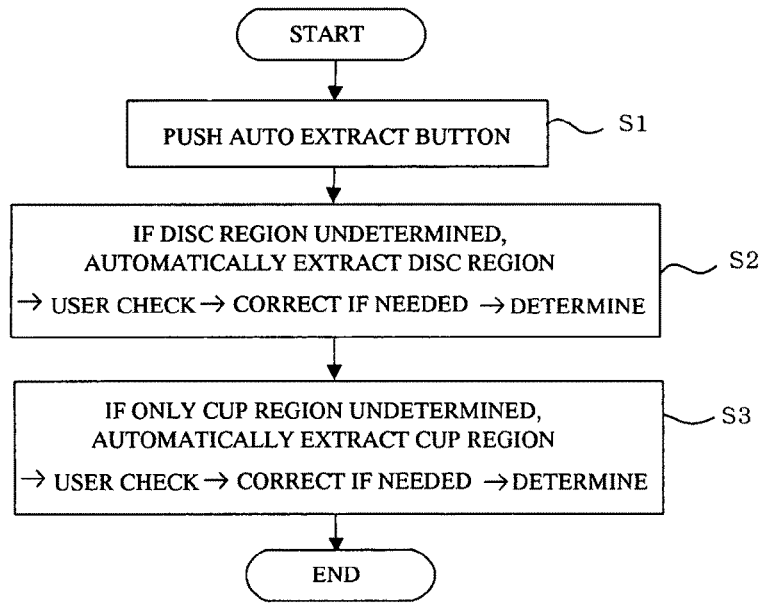
FIG. 3 is a flowchart showing the flow of the entire image processing process of the present invention.
Figure 4:
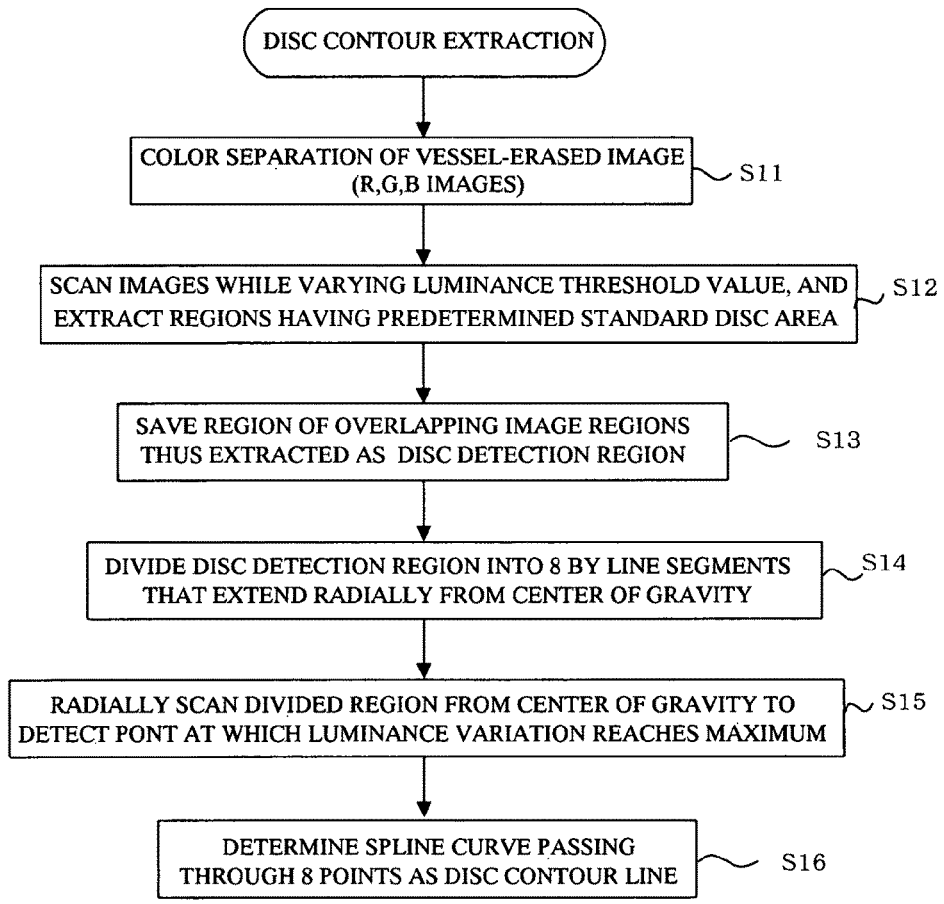
FIG. 4 is a flowchart showing the flow of extraction of disc contours.
Figure 5:
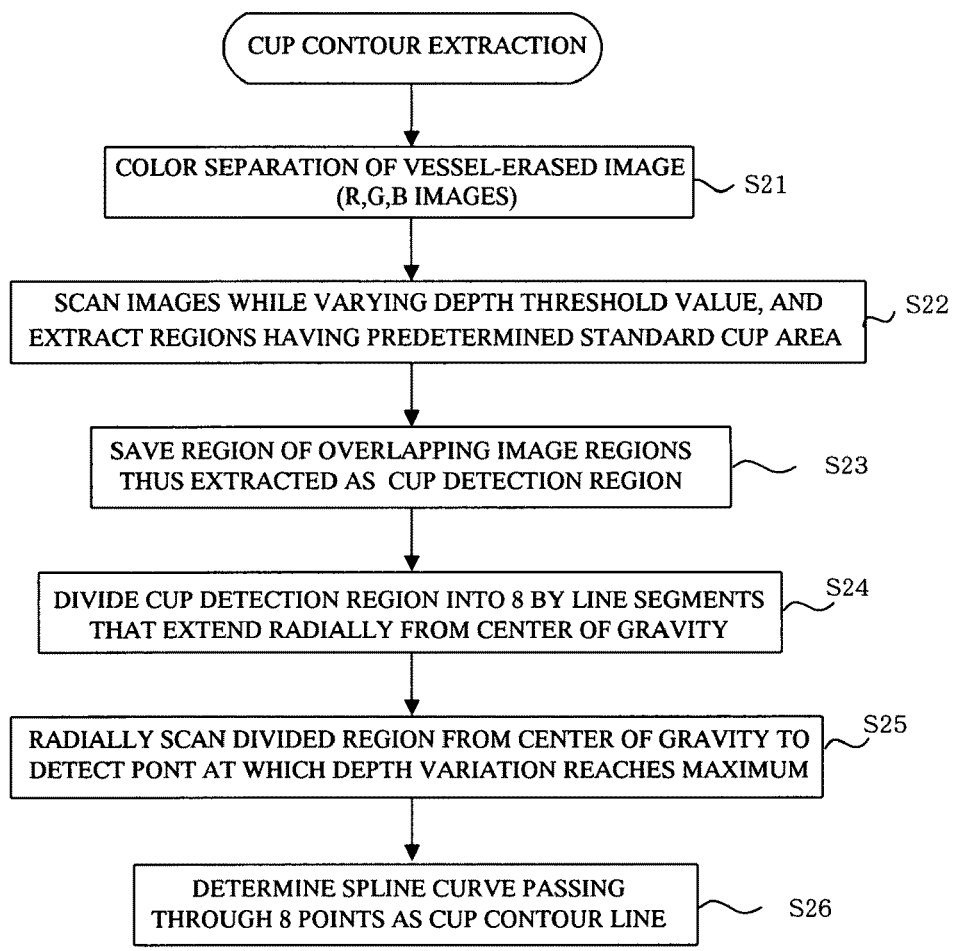
FIG. 5 is a flowchart showing the flow of extraction of cup contours.

The flow of the image processing procedure carried out by the image processing device 100 is illustrated in FIGS. 3 to 5. The program by which the CPU 102 carries out image processing in the image processing device 100 is stored in the ROM 103 or on the hard disk 105, and the CPU 102 loads and executes this program to carry out image processing according to the present embodiment.

FIG. 3 shows the overall flow. As preconditions for image processing, it is assumed that the fundus camera 101 has taken a monocular color image of the eye under examination, or taken color stereo images of a pair of parallax images which allows stereoscopic viewing of the ocular fundus; and that the captured ocular fundus images are stored in the VRAM 104 or the hard disk 105.

In Step S1 of FIG. 3, an automatic extraction button is pushed to automatically extract the disc region or cup region of the optic disc from the ocular fundus image. This is accomplished by pushing the "Auto" button 208 of the "Region Selection" of the screen 200 on the display 107 in FIG. 2.

In Step S2, if the disc region has not yet been determined, automatic extraction of the disc region is performed. The user then checks the extracted region, performs correction if necessary, and pushes the "Determine Contour" button 211. In Step S3, if only the cup region has not yet been determined, automatic extraction of the cup region is performed. The user checks the extracted region, performs correction if necessary, and pushes the "Determine Contour" button 211.

Figure 2:
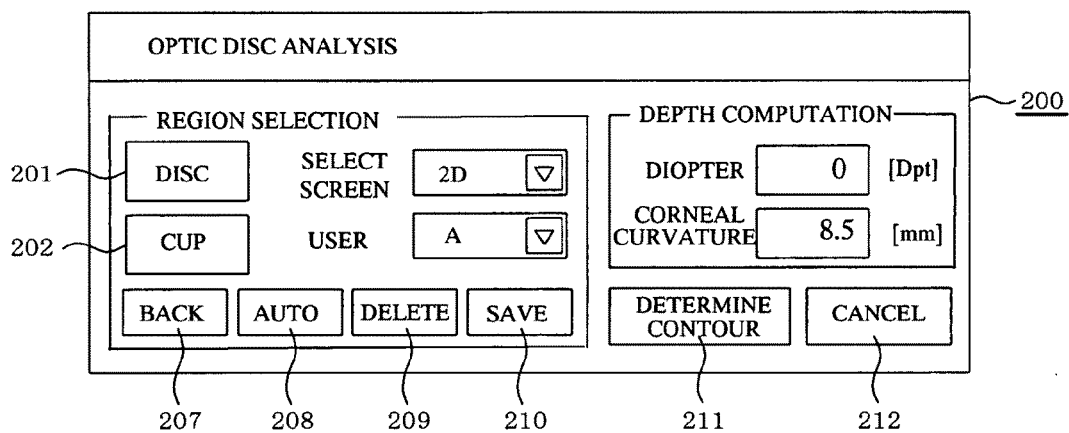
FIG. 2 is an illustrative view showing operation buttons on the display of the image processing system.

Automatic extraction of the disc region or the cup region may be accomplished by respectively pushing the "Disc" button 201 or the "Cup" button 202 shown in FIG. 2, then pushing the "Auto" button 208. The user may check the region, perform correction if necessary, and then push the "Determine Contour" button 211 to determine these contours independently.

In either case, the determined disc region or cup region can be saved to the hard disk 105 by pushing the "Save" button 210. Also, by pushing the "Back" button 207, it is possible to load previously saved contour data, and to call the data up on the display 107 in order to make modifications thereto. By pressing the "Delete" button 209 it is possible to delete editing data etc. To cancel some or all image processing, the "Cancel" button 212 is pushed. In the event that multiple displays are connected, the "Select Screen" button can be used to select the display on which the image is to be displayed. The "User" button can be used to select a user. A "Depth computation" screen is provided as well, and the parameters such as the patient's diopter, corneal curvature, and the like can be selected during depth computation.

FIG. 4 shows the flow of automatic extraction of a disc contour, i.e. the periphery of the disc region.

An ocular fundus image obtained by monocular photography, or one parallax image, for example, the left eye image of a pair of parallax ocular fundus images obtained by stereographic photography is read from the hard disk 105 as the ocular fundus image for disc contour extraction and is saved in the VRAM 104.

In Step S11, a process such as morphology is used to erase blood vessel images from the ocular fundus image in the VRAM 104, and color separation to RGB images is performed. The R image mostly contains information from relatively deep portions of the retina, e.g. from the choroid membrane; the G image mostly contains information from the retinal pigment epithelium; and the B image mostly contains information from the retinal surface.

Figure 6A:
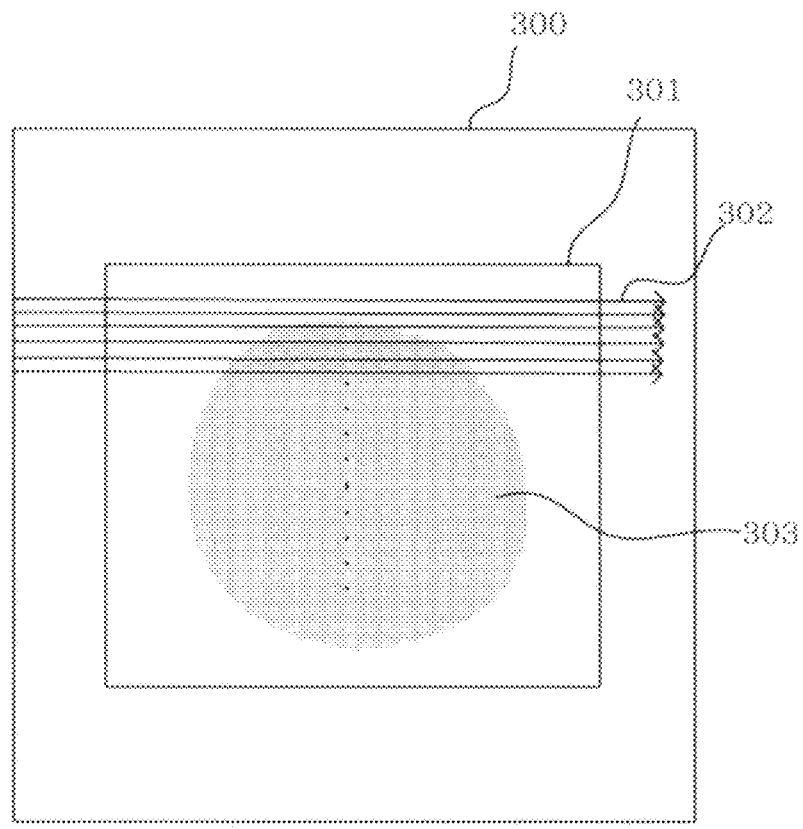
FIG. 6a is an illustrative view showing a method in which scan lines are used to search a disc region having a standard disc area.
Figure 6B:
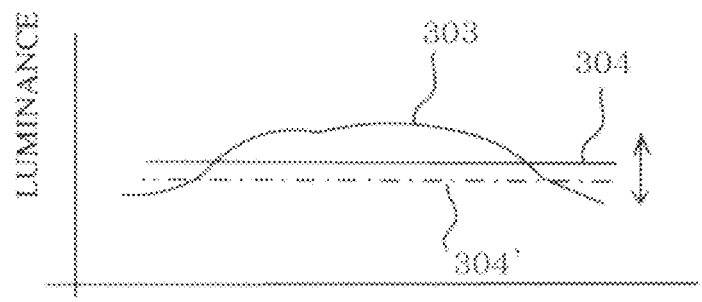
FIG. 6b is an illustrative view showing a luminance distribution of image-processed regions along the scan lines.

Next, in Step S12, the RGB images are scanned for a region of high luminance in proximity to the disc region. FIG. 6a shows scanning along scan lines 302 within a window 301 established in proximity to the disc region of an R image 300 for example. FIG. 6b shows detection of pixels having greater luminance values than a prescribed luminance threshold value 304. If pixels having greater luminance values than the luminance threshold value 304 are detected, it is checked whether the area of the region defined by those pixels is equivalent to or approximately equivalent to a predetermined standard disc area. In the example of FIG. 6a, the pixels of a region 303 indicated by halftone dots have been detected as pixels that have greater luminance values than the luminance threshold value. The region 303 defined by the detected pixels and indicated by halftone dots constitutes a region of luminance greater than a prescribed luminance threshold value. The area of the luminance region increases as the luminance threshold value 304 indicated by the solid line in FIG. 6b decreases to the luminance threshold value 304' indicated by the dot and dash line.

In this way, the image is scanned while varying the luminance threshold value, and a luminance region which has luminance greater than a prescribed luminance threshold value and whose area is equivalent to a predetermined standard disc area is extracted as a region having the standard disc area. The region having the standard disc area extracted in this manner is a region close to the disc region that is ultimately desired. Therefore, the region thus extracted is stored in the VRAM 104 as the disc detection region or detected disc region.

Extraction of such a region is performed on the RGB images. The three regions, i.e. the region of standard disc area extracted from the R image, the region of standard disc area extracted from the G image, and the region of standard disc area extracted from the B image, are superimposed in order to extract the overlapping region, which is then saved as the final disc detection region in the VRAM 104. This is the process of Step S13.

In Step S12, the disc region having the standard disc area was extracted from each of the RGB images, and the region of overlap of these detected images was designated as the disc detection region. However, it is also acceptable to extract a disc region having the standard disc area from the color image prior to color separation to RGB, and to use this as the disc detection region.

Figure 13:
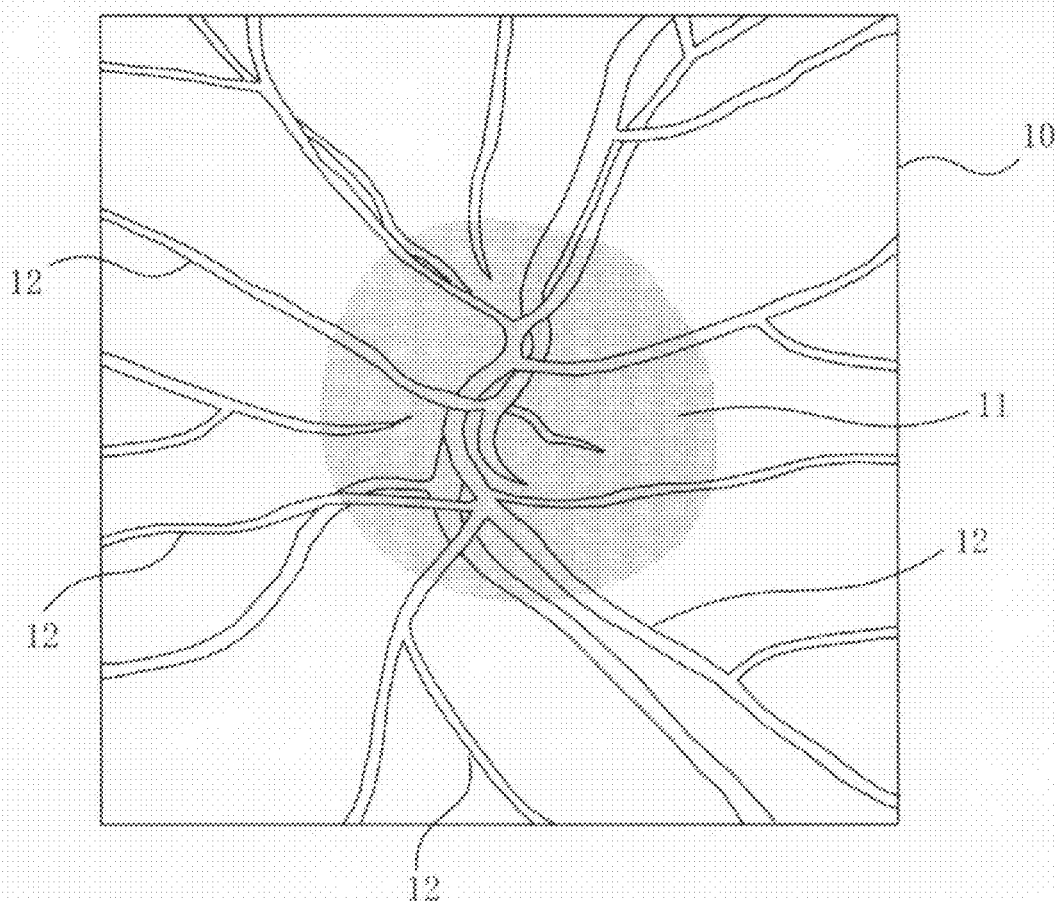
FIG. 13 is an ocular fundus view showing a disc detection region together with blood vessel images.

In FIG. 13, the disc detection region extracted in Step S13 is indicated by symbol 11 and shown together with a color ocular fundus image 10. In the drawing, the erased blood vessel images 12 are restored for reference purposes.

Next, in Step S14, the center of gravity of the disc detection region 11, is calculated, and the disc detection region 11 is divided into eight regions by line segments that extend radially at equiangular intervals (of 45 degrees) from this center.

Figure 14:
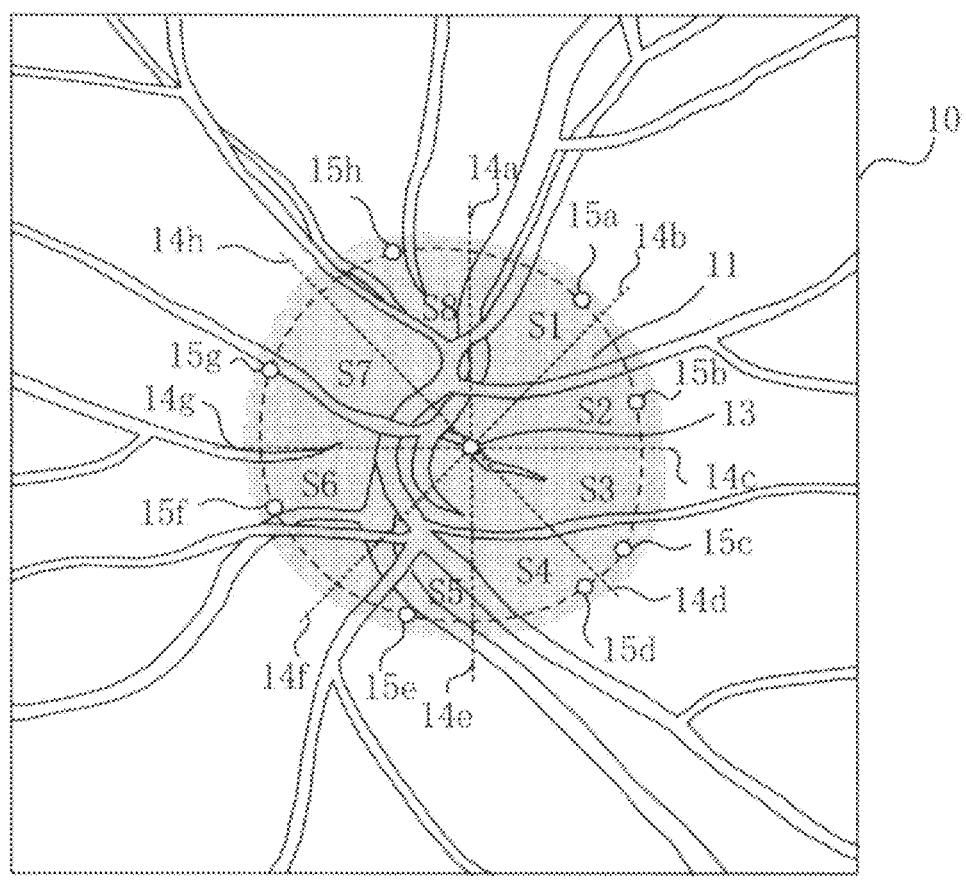
FIG. 14 is an ocular fundus view showing extracted points of maximum luminance variation, shown together with blood vessel images.

FIG. 14 shows the center of gravity 13 of the disc detection region 11 calculated in Step S14 and the eight regions S1 to S8 divided by eight dividing lines 14a to 14h which extend from the center of gravity 13.

Next, each of the eight divided regions S1 to S8 is scanned along scan lines extending radially from the center of gravity 13 in order to detect a point at which luminance varies maximally, i.e. luminance variation reaches a maximum.

Figure 7:
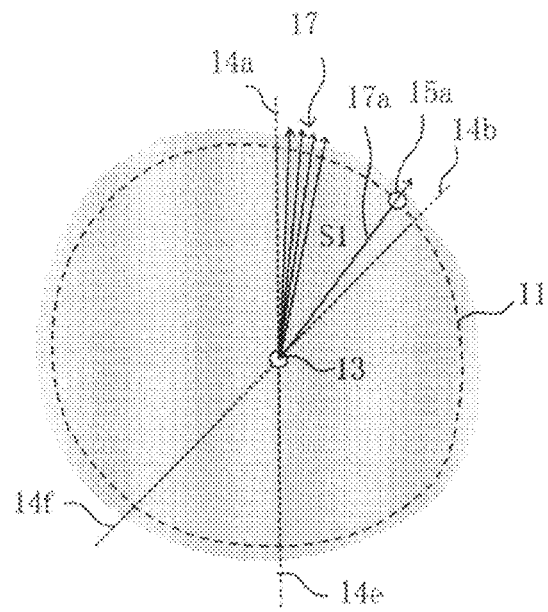
FIG. 7 is an illustrative view showing a method in which a divided disc detection region is angularly scanned to derive therefrom maximum luminance variation.

FIG. 7 shows scanning of one divided region S1 along equiangular scan lines 17 extending radially from the center of gravity 13. Scanning is performed radially from the center of gravity 13 at resolution of from 1 to 2 degrees for example.

Figure 8:
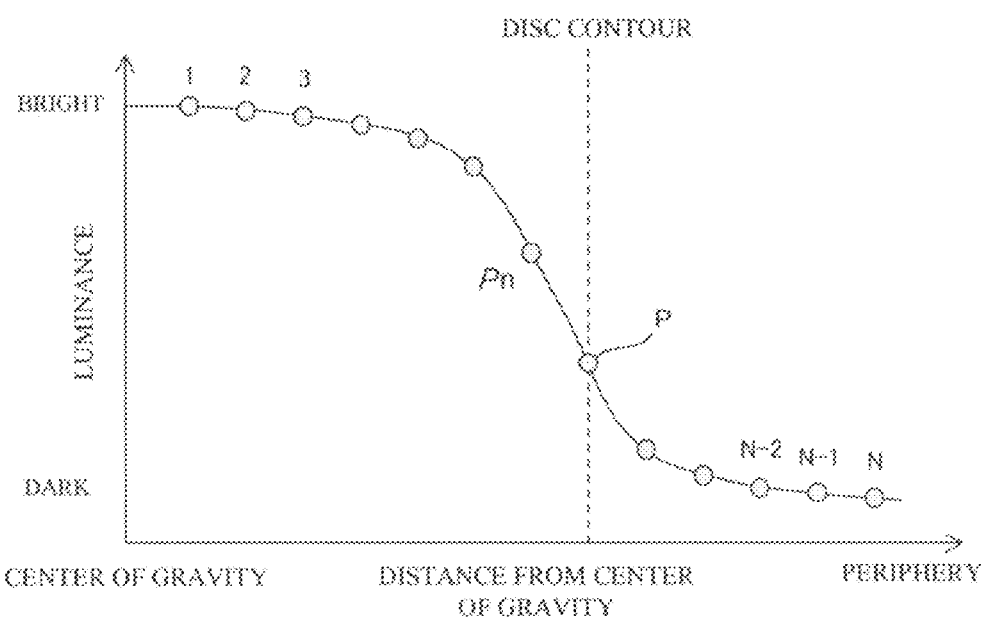
FIG. 8 is an illustrative view showing a method of deriving luminance variation.

FIG. 8 shows luminance variation observed when the disc detection region 11 is scanned along a single angular scan line. The vertical axis in FIG. 8 indicates luminance, and the horizontal axis indicates distance from the center of gravity 13 along the scan line 17. $P_n$ (n=1, 2, 3, ..., N−2, N−1, N) denotes pixels of an ocular fundus image. Luminance variation V in a pixel of interest P, can be represented as $V = D_{n-w} - D_n$, where $D_n$ is the luminance value in the pixel $P_n$ and W is a calculation range determined by the image resolution (e.g. W=1 where image resolution is 0.0053 mm/pixel). This allows the pixel point at which V reaches maximum to be extracted. In the example shown in FIG. 8, luminance variation reaches a maximum at pixel P, and therefore this pixel is extracted as the maximum luminance variation point on the scan line concerned.

This angular scanning is performed on the region S1 to extract the maximum luminance variation point on each scan line. For example, where angular scanning takes place at resolution of 1 degree, 45 maximum luminance variation points will be extracted in the region S1. The one with the highest value of these 45 points is extracted as the disc contour point in the region S1, and is saved to the VRAM 104.

In the example shown in FIG. 7, a maximum luminance variation point 15a detected on angular scan line 17a is the point having the highest value of the maximum luminance variation points in the region S1. Consequently, the point 15a is extracted as the disc contour point in the region S1.

This angular scanning is carried out for each of the regions S1 to S8. Disc contour points, namely maximum luminance variation points extracted from the regions S1 to S8 are shown as 15a to 15h in FIG. 14.

Figure 12:
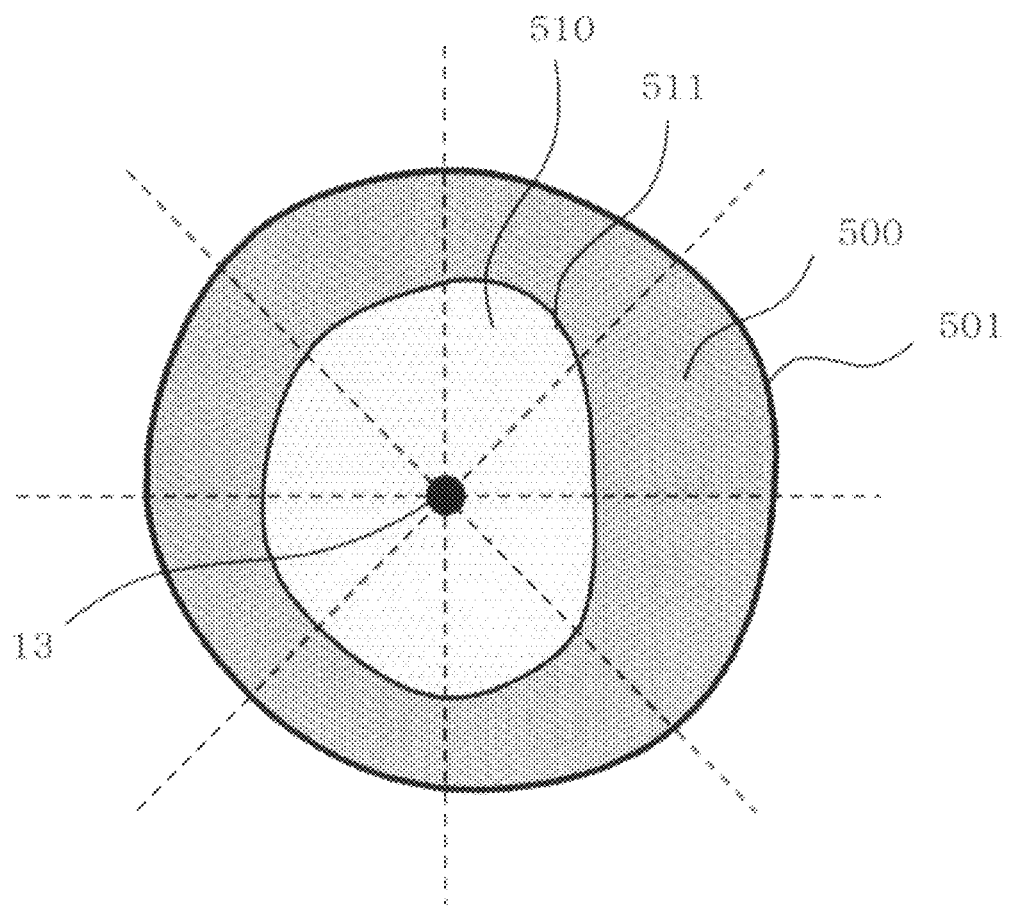
FIG. 12 is an illustrative view showing an extracted disc region and cup region.

The process described above is the process of Step S15. In the following Step S16, the eight extracted points 15a to 15h are joined by a third- or fourth-order spline curve, for example, to derive a disc contour line. The region enclosed by this contour line is designated as the disc region. FIG. 12 shows a disc region 500 and a disc contour line 501 determined in this manner.

FIG. 5 shows the flow of a procedure for automatically extracting the cup contour, i.e., the periphery of the cup region.

The ocular fundus image from which the cup contour is extracted is the same image as that used for disc contour extraction. In Step S21, a process such as morphology is used as well to erase blood vessel images and color separation into RGB images is performed.

For cup contour extraction, parallax is extracted from a pair of parallax images of each component of the RGB images, and on the basis of corresponding pixels in the pair of parallax images, depth data for pixels inside a region in proximity to the disc region is measured using a known method, and the measured depth data is saved to the VRAM 104.

Figure 9A:
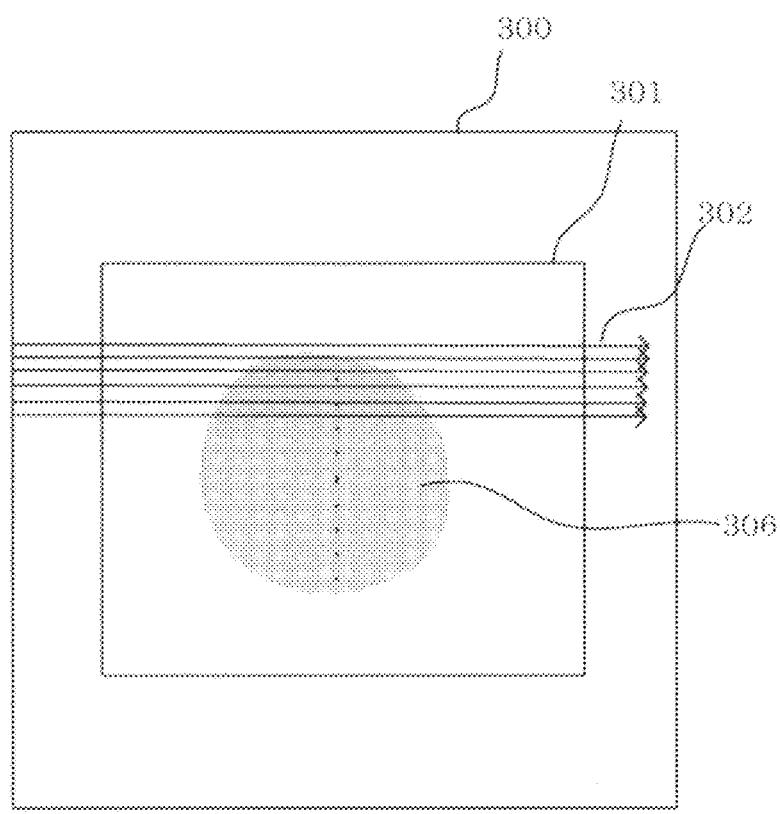
FIG. 9a is an illustrative view showing a method in which scan lines are used to search a cup region having a standard cup area.
Figure 9B:
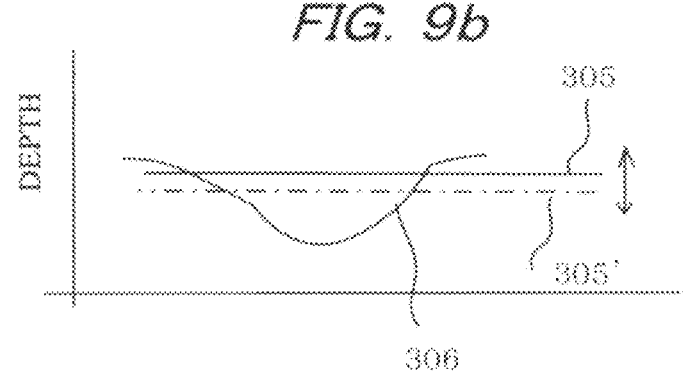
FIG. 9b is an illustrative view showing a depth distribution of image-processed regions along the scan lines.

In Step S22, the RGB images are scanned for a region of great depth, i.e. a deep region in proximity to the disc region. FIG. 9a shows scanning along scan lines 302 within a window 301 established in proximity to the disc region of an R image 300 for example. FIG. 9b shows detection of pixels deeper than a prescribed depth threshold value 305. Pixels deeper than the depth threshold value are detected while successively varying the depth threshold value 305 from larger values to smaller values (or the reverse), and it is checked whether the area of the region defined by those pixels is equivalent to or approximately equivalent to a predetermined standard cup area. In the example of FIG. 9a, the pixels of a region 306 represented by halftone dots have been detected as pixels deeper than the luminance threshold value 305, and the region 306 defined by the detected pixels and represented by halftone dots constitutes a region of greater depth than the depth threshold value. The area of the region decreases as the depth threshold value 305 indicated by the solid line in FIG. 9b decreases to the depth threshold value 305' indicated by the dotted-dashed line.

In this way, the image is scanned while the depth threshold value is varied, and a depth region having a depth greater than a prescribed depth threshold value and having a area equivalent to a predetermined standard cup area is extracted as a region having the standard cup area. The region having the standard cup area thus extracted is a region close to the cup region that is ultimately desired, so that the extracted region is stored in the VRAM 104 as the cup detection region or detected cup region.

Figure 10:
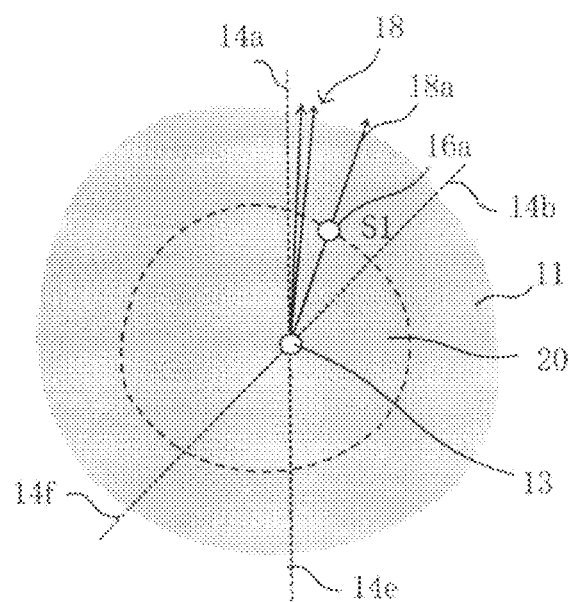
FIG. 10 is an illustrative view showing a method of angular scanning of a divided cup detection region, and deriving maximum depth variation.

Extraction of such a region is performed on the RGB images. The three regions, i.e. the region of standard cup area extracted from the R image, the region of standard cup area extracted from the G image, and the region of standard cup area extracted from the B image, are superimposed, and the region of overlap is extracted as the final cup detection region, which is then saved to the VRAM 104. This is the process of Step S23. FIG. 10 shows an extracted cup detection region 20, represented by a broken line.

In Step S22, a cup region of standard cup area was extracted from each of the RGB images, and the region of overlap of these detected images was designated as the cup detection region. However, it is also acceptable to extract a cup region of standard cup area from the color image prior to color separation to RGB, and to designate this as the cup detection region.

Next, in Step S24, the cup detection region 20 is divided into eight regions by line segments extending radially at equiangular intervals (of 45 degrees) from the center of gravity 13 that was calculated for the disc detection region.

Next, each of the eight divided regions S1 to S8 is scanned along scan lines extending radially from the center of gravity 13 to detect a point at which depth variation reaches a maximum.

FIG. 10 shows scanning of one divided region S1 along equiangular scan lines 18 extending radially from the center of gravity 13. Scanning is performed radially from the center of gravity 13 at resolution of from 1 to 2 degrees for example.

Figure 11:
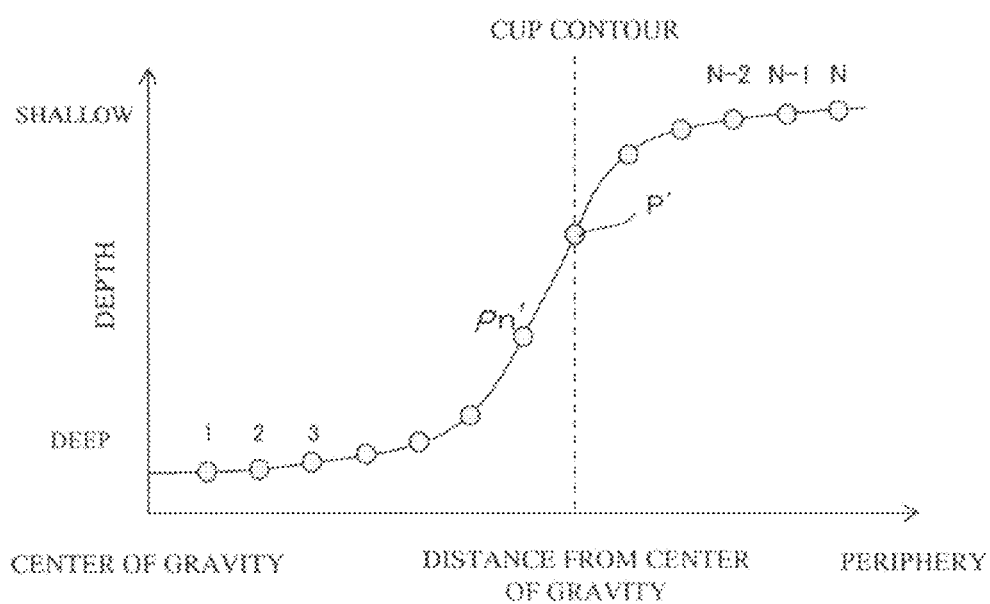
FIG. 11 is an illustrative view showing a method of deriving depth variation.

FIG. 11 shows depth variation observed when the cup detection region 20 is scanned along a single angular scan line. The vertical axis in FIG. 11 indicates depth from the retina, and the horizontal axis indicates distance from the center of gravity 13 along the scan line 18. $P_n$ (n=1, 2, 3, . . . , N-2, N-1, N) denotes pixels of an ocular fundus image. Depth variation U in a pixel of interest $P_n'$ can be represented as $U=D_{n+w}-D_{n-w}$, where $D_n$ is depth data in the pixel $P_n$ and W is a calculation range determined by the image resolution (e.g. W=2 where image resolution is 0.0053 mm/pixel). This allows the pixel point at which U reaches maximum to be extracted. In the example shown in FIG. 11, depth variation reaches maximum at pixel P', and therefore this pixel is extracted as the maximum depth variation point on the scan line concerned.

This angular scanning is performed on the region S1 to extract the maximum depth variation point on each scan line. For example, where angular scanning takes place at resolution of 1 degree, 45 maximum depth points will be extracted in the region S1. Therefore, the one with the highest value of these 45 points is extracted as the cup contour point in the region S1, and is saved to the VRAM 104.

In the example shown in FIG. 10, a maximum depth variation point 16a detected on angular scan line 18a is the maximum depth variation point in the region S1. Consequently, the point 16a is extracted as the cup contour point in the region S1.

Figure 15:
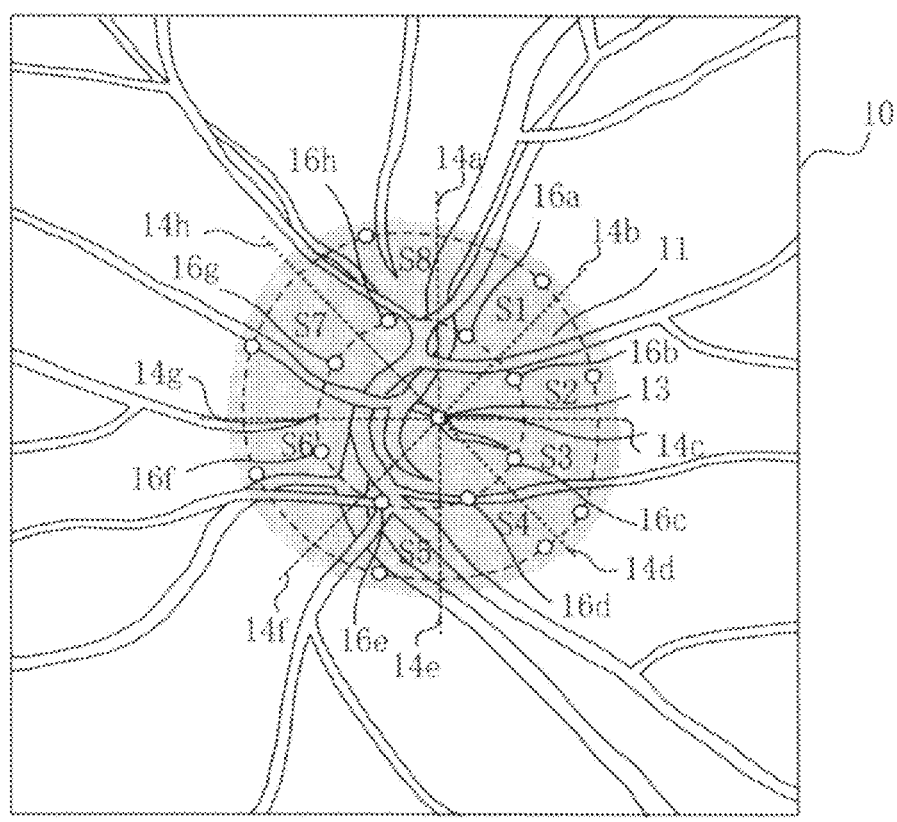
FIG. 15 is an ocular fundus view showing extracted points of maximum depth variation, shown together with blood vessel images.

This angular scanning is carried out for each of the regions S1 to S8. Cup contour points, namely maximum depth variation points extracted from the regions S1 to S8, are shown as 16a to 16h in FIG. 15.

The process described above is the process of Step S25. In the following Step S26, the eight extracted points 16a to 16h are joined by a third- or fourth-order spline curve for example, to derive a cup contour line. The region enclosed by this contour line is designated as the cup region. FIG. 12 shows a cup region 510 and a cup contour line 511 determined in this manner.

The disk region 500 and the contour line 501 thereof as well as the cup region 510 and the contour line 511 thereof, which are obtained by image processing as described above, may be saved as appended information to the ocular fundus image and recorded to a recording medium such as the hard disk 105. Saved disc regions and cup regions may be displayed in time series on the display 107. Also, saved disc contour lines and cup contour lines may be displayed on the display 107 to allow for correction of these contour lines if necessary.

While the disc detection region 11 and the cup detection region 20 herein are divided into eight parts by equiangular dividing lines extending from the center, the number of divisions is not limited to 8; some other plural number of divisions, such as 6 divisions or 12 divisions, is also acceptable. The angular resolution of the scan lines need not be set to a fixed resolution. The angle interval for scanning may vary according to angle region, for example, using finer angular intervals for the scan lines 17, 18 in angle regions in which the contour lines of the disc region or the cup region are more complex, and coarser ones in angle regions in which the contour lines of the disc region or the cup region are fairly simple.

According to the embodiment described above, the center of gravity of the disk region is selected when determining the contour line of a cup region, and the disk region and the cup region are divided into a plurality of regions by a plurality of dividing lines extending radially from the center of gravity. However, one may instead select, as the point set within the disc region for the purpose of dividing the disk region and the cup region, the deepest point inside the disc region, or the center of a region such that the area deeper than a prescribed depth threshold value inside the disc region is equivalent to a predetermined standard cup area. The disk region and the cup region may then be divided into a plurality of regions by a plurality of dividing lines extending radially from this selected point or center.

In the embodiment described above, the standard disc area means an area of the disc region serving as a reference, and may be the average value of measured area of a large number of disc regions, and the standard cup area means an area of the cup region serving as a reference, and may be the average value of the measured area of a large number of cup regions.

In Step S13, a luminance region having a greater luminance value than a predetermined standard luminance value may be extracted as the disc region, and in Step S23, a region of greater depth than a predetermined standard depth value may be extracted as the cup region. In this case, a luminance region or depth region may be extracted in each of images obtained by color separation of an image into RGB images, and the region of overlap thereof may be selected as the disc region or cup region. Alternatively, the luminance region or depth region may be detected from the image prior to color separation into RGB images, and the disc region or cup region may be extracted therefrom.

What is claimed is:

1. An image processing method for processing an image of an optic disc region in a photographed ocular fundus, comprising:
    extracting a disc region;
    dividing the disc region into a plurality of regions by a plurality of dividing lines that extend radially from the center of gravity of the disc region;
    radially scanning the divided regions from the center of gravity while angles are shifted in order to detect in each individual region a point at which luminance variation reaches a maximum; and
    determining a contour line of the disc region based on the detected points at which luminance variation reaches a maximum.

2. An image processing method according to claim 1, wherein a luminance region having a greater luminance value than a prescribed luminance threshold value and having an area equivalent to a predetermined standard disc area is extracted as the disc region.

3. An image processing method according to claim 1, wherein a spline curve is used to connect the points of maximum luminance variation, thereby creating the disc contour line and determining the disc region.

4. An image processing method according to claim 1, wherein the created disc contour line is displayed on a display so that it can be corrected.

5. An image processing method according to claim 1, wherein the extracted disc region is saved as appended information for an ocular fundus image, and disc regions can be displayed in a time series.

6. An image processing method for processing an image of an optic disc region in a photographed ocular fundus, comprising:
    dividing a disc region into a plurality of regions by a plurality of dividing lines that extend radially from a point that is set in the disc region;
    radially scanning the divided regions from the set point while angles are shifted in order to detect in each individual region a point at which depth variation reaches a maximum; and
    determining a contour line of the cup region based on the detected points at which depth variation reaches a maximum.

7. An image processing method according to claim 6, wherein the point set within the disc region is a center of gravity of the disc region.

8. An image processing method according to claim 6, wherein the point set within the disc region is the deepest point within the disc region.

9. An image processing method according to claim 6, wherein the point set within the disc region is the center of gravity of a region that is deeper than a prescribed depth threshold value inside the disc region, and whose area is equivalent to a predetermined standard cup area.

10. An image processing method according to claim 6, wherein a spline curve is used to connect the points of maximum depth variation, thereby creating the cup contour line and determining the cup region.

11. An image processing method according to claim 6, wherein the cup contour line is displayed on a display so that it can be corrected.

12. An image processing method according to claim 6, wherein the extracted cup region is saved as appended information for an ocular fundus image, and the cup regions can be displayed in a time series.

13. An image processing device comprising an ocular fundus imaging device for carrying out the image processing method according to claim 1, and image processing means for processing an image of a photographed ocular fundus.

14. An image processing device comprising an ocular fundus imaging device for carrying out the image processing method according to claim 6, and image processing means for processing an image of a photographed ocular fundus.

* * * * *